United States Patent [19]

Ladouceur

[11] Patent Number: 4,971,499
[45] Date of Patent: Nov. 20, 1990

[54] NUT AND PANEL ASSEMBLY
[76] Inventor: Harold A. Ladouceur, 30123 Bentley, Livonia, Mich. 48154
[21] Appl. No.: 685,418
[22] Filed: Dec. 24, 1984
[51] Int. Cl.$^5$ ............................................. F16B 37/04
[52] U.S. Cl. .................................... 411/179; 411/180
[58] Field of Search ............... 411/176, 177, 179, 180, 411/181, 183, 184

[56] References Cited
U.S. PATENT DOCUMENTS

| 3,439,723 | 4/1969 | Double et al. | 411/179 |
| 3,648,747 | 3/1972 | Steward | 411/179 |
| 3,711,931 | 1/1973 | Ladouceur et al. | 29/412 |
| 3,845,860 | 11/1974 | Ladouceur et al. | 411/179 |
| 3,878,599 | 4/1975 | Ladouceur et al. | 411/179 |
| 3,926,236 | 12/1975 | Pouch et al. | 411/179 |
| 4,313,261 | 2/1982 | Ladouceur | 29/798 |

FOREIGN PATENT DOCUMENTS 2064046  6/1981  United Kingdom ............... 411/180

Primary Examiner—Neill R. Wilson
Attorney, Agent, or Firm—Dykema Gossett

[57] ABSTRACT

A flush mountable pierce nut including a rectangular pilot portion, flange portions on opposed sides of the pilot portion and parallel re-entrant grooves defined in the flange portions on opposed sides of the pilot portion, wherein the areas of the fracture planes through the axis of the nut and generated from the nut grooves are generally equal pursuant to a predetermined dimensional relationship, thereby minimizing the material costs of the nut fastener while maintaining the optimum strength of the fastener in a proof load condition.

3 Claims, 2 Drawing Sheets

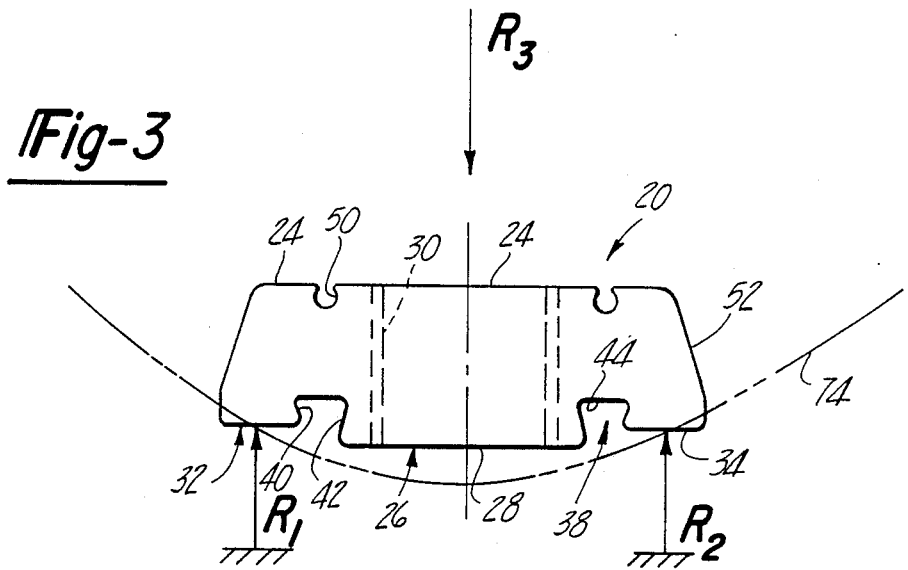
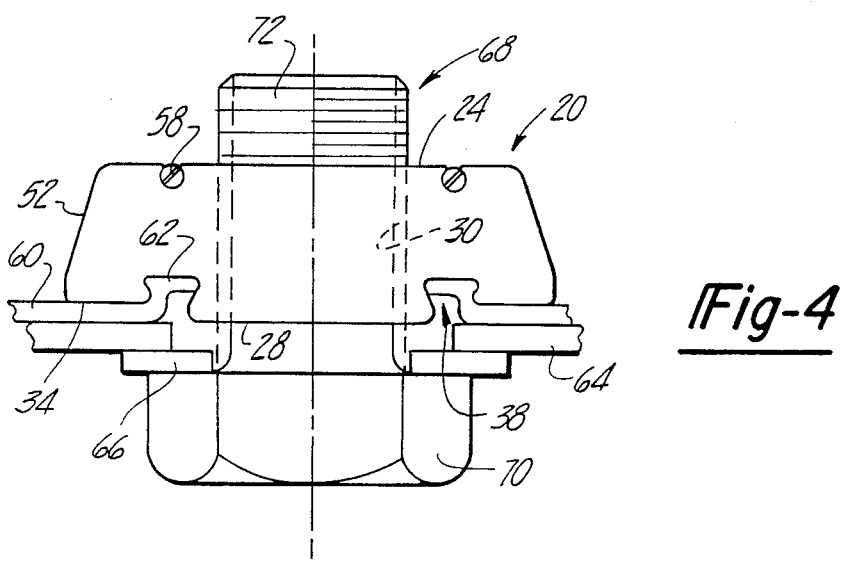
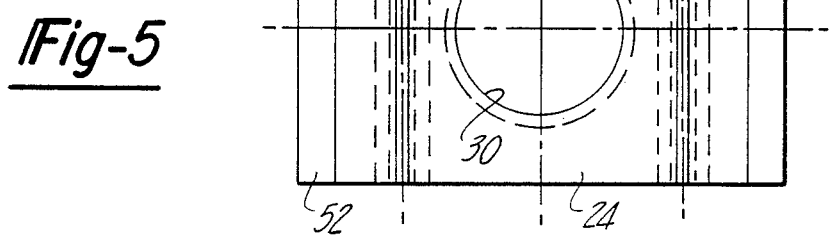

NUT AND PANEL ASSEMBLY

FIELD OF THE INVENTION

A flush-mountable pierce nut having a self-piercing pilot portion and re-entrant grooves on opposed sides of the pilot portion which receive and retain the pierced edges of a panel pierced by said pilot portion, wherein the areas of the fracture planes are generally equal pursuant to a predetermined dimensional relationship.

Self-piercing flush-mountable pierce nuts of the general type described herein have been known and utilized in mass production, particularly by the automotive industry, for several years. Examples of such flush-mountable pierce nuts are found in the following United States patents assigned to the assignee of this application Ser. Nos. 3,439,723, 3,648,747, 3,711,931 and 4,313,261. The preferred embodiments of the flush-mountable pierce nuts disclosed in the prior art were formed from rolled steel stock which is then cut to length, pierced and tapped. The pierce nuts may be interconnected by a frangible connector means, such as a metal wire or wires as disclosed in the above identified patents. Alternatively, the pierce nuts may be fed in bulk form to an installation head which installs the pierce nut in a panel located opposite the installation head. In a typical automotive application, the pierce nut installation head is attached to one die shoe of a reciprocal press and a die button is installed in the opposed die shoe, such that a pierce nut is installed in a panel located in the press with each reciprocation of the press. As described in the above identified prior art patents, the panel may be simultaneously formed into a contoured configuration by the press and several pierce nuts may be installed with each stroke of the press.

Flush-mountable pierce nuts generally include a central pilot portion which extends from one face of the nut having a generally rectangular piercing face. Flange portions are located on opposed sides of the pilot portion and the pierce nut preferably includes re-entrant grooves having a restricted groove opening defined in the flange portions adjacent the pilot portion. In a pierce nut formed from rolled metal stock, the nut grooves are parallel and formed during the rolling process. The pierce nut serves as a punch, wherein the piercing face of the pilot portion pierces a slug from the panel which is then received in a discharge opening in the die button. The die button includes parallel upstanding clinching lips which are received in the nut grooves to deform the pierced panel edges into the nut grooves, forming a mechanical interlock between the nut and panel. In a flush-mounted assembly, the flange portions include panel supporting faces which are generally parallel to but spaced below the plane of the pilot portion piercing face, such that the piercing face is generally coincident or flush with the panel following installation.

The dimensional relation between the width of the nut and pilot portion, the depth of the grooves, the length of the nut, etc. has previously been determined on a trial and error basis. That is, where a pierce nut fails, generally in stress fracture, the thickness or width of the nut is simply increased until the failures across the increased dimension stop. This has resulted in increased and unnecessary material costs. It is a principal object of this invention to reduce the material costs while retaining the optimum performance of the nut fastener.

It has now been discovered that a flush-mountable pierce nut of the type described herein fails principally in five fracture planes and it is possible to optimize the dimensional relationship such that the beam load of the nut or the beam load of the nut and panel assembly is equal to or greater than the proof load of the bolt while optimizing the volume of the nut, reducing the material cost.

SUMMARY OF THE INVENTION

As described, the pierce nut of this invention is flush-mountable in a panel, wherein the nut serves as a punch in a die set. The die set generally includes the pierce nut and a die button, wherein the pierce nut is generally installed by an installation head located opposite the die button.

The pierce nut includes a rectangular pilot portion having a generally flat piercing face, a bore extending through the pilot portion, generally perpendicular to the piercing face, flange portions on opposed sides of the pilot portion, each having a panel supporting face generally parallel to and spaced below the plane of the pilot piercing face, and parallel re-entrant grooves defined in the flange portions at the opposed sides of the pilot portion. The re-entrant grooves have opposed relatively inclined side walls which define a restricted opening at the plane of the panel supporting faces of the flange portions and a bottom wall having a width which is greater than the width of the restricted groove opening. The re-entrant grooves receive and retain the pierced edges of a panel pierced by the pilot portion piercing face, thereby forming a mechanical interlock with the panel. Where the pierce nut is utilized in conjunction with a die button, the die button preferably includes a bore which receives the slug pierced from the panel by the pilot portion and upstanding parallel clinching lips which deform the edges of the panel adjacent the pierced panel opening into the re-entrant nut grooves, forming a secure interlock between the nut and panel.

The pierce nut is preferably formed by cutting off a preformed section having a longitudinal axis parallel to the grooves, such as a rolled metal section. The fastener then has a cut-off length which is dependent upon the diameter of the nut bore to avoid fracture of the pilot portion in a plane parallel to the grooves defined through the axis of the nut bore perpendicular to the piercing face. In a typical application of the pierce nut of this invention, the pierce nut is utilized to attach a second structural member to the panel to which the nut is permanently attached. The structural member, such as a second panel, includes a bore which is aligned with the nut bore and a bolt or stud is received through the bore in the structural member and threaded into the nut bore thereby affixing the structural member to the panel. In a flush-mounted pierce nut and panel assembly, the structural member may be mounted flush against the panel to which the pierce nut is attached and the proof load generated by the bolt is transmitted directly through the panel supporting faces of the nut flange portions.

As described, a flush-mounted pierce nut of the type described will fail in one of five fracture planes. The first fracture plane $P_1$ is defined through the axis of the bore parallel to the nut grooves and perpendicular to the piercing face, as described above. The second fracture plane $P_2$ extends through the axis of the nut bore at an angle to the top face of the nut, opposite the piercing face, through the inside radiused corner of one of the nut grooves at the bottom wall. The third fracture plane $P_3$ is defined through the inside radiused corner of one of the nut grooves through the top face of the nut. It will be understood that the fracture planes $P_2$ and $P_3$ may be generated through either nut groove, resulting in five actual fracture planes. Based upon this information, it is possible to optimize the performance of the pierce nut by making the nut areas A of the fracture planes equal, such that the nut is not more likely to fail in any one fracture plane. Further, if the areas of the fracture planes are at least equal to the beam load to which the nut and panel assembly is subjected, divided by the strength of the material from which the nut is formed, the strength of the nut will be at least equal to the proof load of the bolt used in the fastener assembly.

The improved flush-mountable pierce nut of this invention thus minimizes the volume and therefore the material costs of the fastener while maintaining optimum and uniform strength which is at least equal to the proof load of the bolt of the assembly. Thus, the bolt should fail prior to failure of the pierce nut. Utilizing this dimensional relationship, it is possible to more efficiently display the strength qualities required in the anticipated fastening assembly. This is accomplished by dimensioning the nut fastener such that the areas A of the fracture planes $P_1$, $P_2$ and $P_3$ are approximately equal pursuant to the following dimensional relationship:

$$L = \frac{A}{\left(\left[\frac{AK(P - G + g)}{2\cos a \left(AK + \frac{\pi D^2}{8\cos a}\right)}\right]^2 - \left(\frac{G}{2}\right)^2\right)^{\frac{1}{2}}} + E + h$$

In the above described dimensional relationship, L is the cut-off length of the nut fastener; A is the areas of the nut through the fracture planes $P_1$, $P_2$ and $P_3$, which is at least equal to the beam load of the nut divided by the strength of the material; P is the width of the pilot portion; K is the stress factor for filleted bars, taking into account the radius at the inside bottom wall of the groove; g is the width of the bottom wall of the groove; E is the depth of the groove measured from the panel supporting surfaces of the flange portion; h is the distance between the pilot piercing face and the panel supporting surfaces of the flange portions; D is the diameter of the nut bore; and, the angle a is the acute angle defined between fracture planes $P_1$ and $P_2$. The thickness of the nut, T, measured between the top face and the piercing face of the pilot portion, is determined by the proof load of the nut utilized in the nut, panel and bolt assembly, as may be specified by industry standards.

In actual practice, the material costs for flush-mounted pierce nuts has been reduced by as much as twenty-seven percent (27%) utilizing the dimensional relationship defined above, while maintaining the pull through, push through, beam strength and proof load of the nut, thereby optimizing the performance of the nut while substantially reducing the material costs. Other advantages and meritorious features of the flush-mountable pierce nut of this invention will be more fully understood from the following description of the preferred embodiments, the appended claims and the drawings, a brief description of which follows.

BRIEF DESCRIPTION OF THE DRAWINGS

FIG. 3 illustrates the pierce nut shown in FIG. 1 in beam load;

FIG. 4 is a partially cross-sectioned side view of a pierce nut and panel assembly; and FIG. 5 is a top view of the pierce nut shown in FIGS. 1 and 3.

DETAILED DESCRIPTION OF THE PREFERRED EMBODIMENTS OF THIS INVENTION

Figures 1, 2:
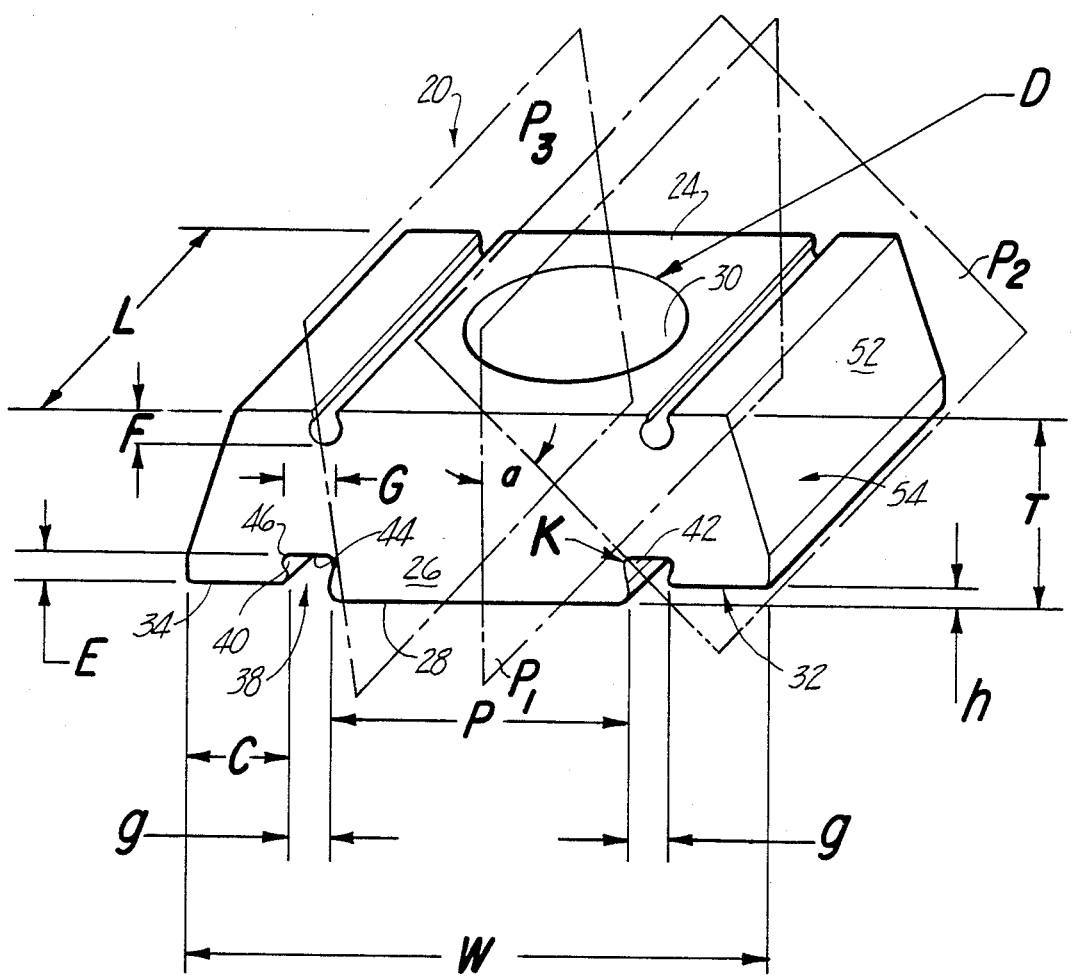
FIG. 1 is a top perspective view of an embodiment of the flush-mountable pierce nut of this invention illustrating the fracture planes.
FIG. 2 is an end view of the pierce nut shown in FIG. 1 and the configuration of the prior pierce nut superimposed in phantom.

The self-piercing flush-mountable nut or pierce nut 20 illustrated in FIG. 1 includes a generally planar top face 24, a pilot portion 26 having a flat rectangular piercing face 28, a nut bore 30 which extends through the pilot portion and flange portions 32 on opposed sides of the pilot portion having panel supporting faces 34 generally parallel to but spaced from the plane of the piercing face 28. As disclosed more fully in the above identified United States patents, which are assigned to the assignee of this application, a pierce nut functions as an expendable punch in a die set, wherein the piercing face 28 of the pilot portion pierces or punches a slug from a panel and the portion of the panel adjacent the pierced panel edge is deformed into grooves adjacent the pilot portion. In a flush-mountable pierce nut of the type disclosed herein, the pierce nut preferably includes parallel re-entrant grooves 38 in the flange portions 32 on opposed sides of the pilot portion 26. The grooves are defined as re-entrant because the width g of the opening of the grooves is less than the width of the grooves spaced from the opening to entrap panel metal during installation. The disclosed and preferred embodiment of the re-entrant grooves 38 include opposed relatively inclined side walls 40 and 42 and a bottom wall 44. As will be understood, either or both side walls may be inclined relative to a perpendicular plane through the axis of the groove to define a re-entrant groove or the groove may be made re-entrant during the installation by deforming the flange portions.

In a typical application, as described in the above identified United States patents, a pierce nut is permanently installed in a panel by an installation apparatus which may be mounted in a reciprocal die press. The pierce nut installation head is normally mounted to one die platen and a die button is installed in the opposed die platen. The pierce nuts are fed into the installation head, which includes a reciprocal plunger which engages the top face 24 of the pierce nut and drives the piercing face 28 of the pilot portion 26 engagement with the panel. The die button normally includes parallel upstanding clinching lips which are aligned with and received within the re-entrant grooves 38. The die button also includes a rectangular opening which receives the pilot portion 26 and the slug pierced from the panel. A pierce nut is thus permanently installed in the panel with each stroke of the die press. The panel may be simultaneously formed in the die press and several pierce nuts installed with each stroke of the press.

Pierce nuts are presently formed from rolled metal stock wherein the general outline or configuration of the nut is rolled, forming a continuous strip having the general configuration of the pierce nut shown in FIG. 1, including the re-entrant grooves. As shown, the bottom wall 44 of each groove is preferably joined to the side walls 40 and 42 by arcuate surfaces 46, reducing the likelihood of fracture during the installation of the nut. The side walls 54 of the nut preferably include inclined faces 52, reducing the total volume of the nut strip.

The individual nuts are then cut or sheared from the strip. The nut blank is then pierced, forming the nut bore 30 and the nut bore may be internally threaded or tapped. The nuts may then be fed in bulk form to the pierce nut installation head and installed in a panel, as described above. Alternatively, frangible connector means, as described in the above referenced United States patents, may be used to interconnect the nuts in a continuous strip. Where the nuts are to be interconnected in a strip by wires, wire grooves 50 are rolled in the nut strip during the rolling operation. The wires 58 may then be permanently retained in the wire grooves 50 by knurling or other conventional means. Where the pierce nuts are fed to the installation head in a continuous strip, the plunger breaks or shears the frangible connector means during the installation of the pierce nut.

As best shown in FIG. 4, a flush-mounted pierce nut has several advantages over a conventional pierce nut. As described above, the pierce nut 20 is permanently installed in a panel 60 and the clinching lips of the die button (not shown) deform the portion 62 of the panel adjacent the pierced panel opening into the re-entrant grooves 38. The panel portions 62 are thus entrapped in the grooves, forming a secure mechanical interlock between the panel 60 and the pierce nut 20. As described above, the panel supporting faces 34 of the flange portions 32 are spaced from the plane of the piercing face 28 (see h in FIG. 1), which is generally less than the thickness of the panel 60. The pilot piercing face 28 is thus generally flush with the main portion of the panel 60. The panel 60 may then be attached to a second structural member 64, such as a panel, as shown in FIG. 4. In a typical installation, a washer 66 is aligned with the nut bore 30 and a bolt 68 having a head portion 70 and a threaded shank portion 72 is threaded into the nut bore, securing the panel 60 to the structural member 64. As will be understood from FIG. 4, the axial load of the bolt $R_3$ (see FIG. 3) is transmitted through the bearing faces 34 of the flange portions 32 as represented by $R_1$ and $R_2$ of FIG. 3. This is referred to as the beam load of the nut or the nut and panel assembly. There are several destructive tests which may be performed to determine the strength or integrity of a nut fastener and panel assembly, including a pull-through test, wherein the force required to pull the nut fastener through the panel opening is determined, a push-off test, wherein the force required to push the nut off the panel is determined, and the beam load test described above. Because of the superior integrity of the mechanical interlock between the panel and the nut, and the flanged configuration of the nut, the flush-mounted pierce nut and panel assembly more than meets the minimum pull-through and push-off requirements of the industry. The beam load test therefore provides a more meaningful determination of the strength of the flush-mounted nut and panel assembly.

As shown in FIG. 3, the beam load test of the nut 20 simulates the load placed on the nut in the actual nut and panel assembly. As the bolt 68 is torqued in the nut 20, the reactive force $R_3$ is transmitted through the flange portions 32, as shown at $R_1$ and $R_2$. This force tends to bow the nut as shown by the phantom curve 74. It has now been discovered that a flush-mounted pierce nut of the type disclosed will fail in the nut and panel assembly shown in FIG. 4 in one of five shear planes, as shown in FIG. 1. These shear or fracture planes include $P_1$, which is defined through the axis of the nut bore 30, perpendicular to the top and bottom faces of the nut, 24 and 28. The second fracture plane $P_2$ is defined at an acute angle through the inner arcuate surface 46 of the re-entrant groove and the axis of the nut bore 30. The third fracture plane $P_3$ is defined through the inner arcuate surface 46 of the groove and the top surface 24 of the nut. As will be understood, the fracture plane $P_3$ will be defined through the center of the groove 50 where the nut includes grooves for receiving the frangible connector means. Otherwise, the fracture plane $P_3$ will be perpendicular to the top face 24. Further, the fracture planes $P_2$ and $P_3$ are duplicated on opposed sides of the nut, resulting in five fracture planes.

As described above, the prior practice has been to simply increase the thickness of the nut where fractures are observed. For example, the depth of the groove E and the distance between the panel supporting surfaces 34 and the piercing surface 28 is determined by the thickness of the panel to which the nut is installed. Further, the diameter of the nut bore is determined by the application, for example a nut for an eight millimeter bolt. When several fracture failures are observed in a particular size nut, the nut is simply beefed up to reduce or eliminate the failures. Thus, the dimensional relationship between the length, width, groove depth, pilot height, etc. has been determined on a trial and error basis. In an effort to reduce the material cost of the flush-mountable pierce nut and determine the causes of failure, tests were conducted to determine the optimum dimensional relationship. It was then discovered that the volume of the nut and the material costs could be reduced in most nut sizes without sacrificing the integrity of the nut, as described hereinbelow.

First, it was determined that the areas $A_1$, $A_2$ and $A_3$ of the nut in the fracture planes $P_1$, $P_2$ and $P_3$ should be approximately equal to avoid a predictable fracture in any specific fracture plane. The areas of the nut in the fracture planes was then determined, as set forth below.

$A_1$, which is the area of the nut in fracture plane $P_1$ may be defined as follows:

$$A_1 = (L-D)T$$

wherein L is the cut-off length of the nut, as shown in FIG. 1, D is the diameter of the nut bore and T is the overall thickness of the nut, measured between the top face 24 and the piercing face 28 of the pilot portion.

Because the fracture plane $P_2$ is defined at an angle through the nut bore, the area $A_2$ of the nut in fracture plane $P_2$ must be defined in trigonometric functions, as follows:

$$A_2 = \left[ L(Y_1) - \frac{\pi}{2}\left(Y \times \frac{D}{2}\right) \right]\frac{1}{K}$$

Wherein $Y = \dfrac{D}{2\cos a}$ and $Y_1 = \dfrac{P - G + g}{2\cos a}$

As will be understood, the area of the nut bore in fracture plane $P_2$ is an ellipse, wherein Y is equal to one half the major diameter of the ellipse cut by shear plane $P_2$, and $Y_1$ is the length of the plane measured between the inside arcuate surface 46 of the re-entrant groove and the center of the nut at the top face 24. As shown in FIG. 1, P is the width of the pilot piercing face 28, G is the width of the re-entrant groove 38 at the bottom wall 44, g is the width of the restricted opening to the re-entrant groove and the angle a is the acute angle between fracture planes $P_1$ and $P_2$.

$A_3$, which is the area of the nut in fracture plane $P_3$, may be defined as follows where the nut does not include grooves 50 in the top face 24 of the nut and the fracture plane $P_3$ is perpendicular to the top face:

$$A_3 = (T \cdot E \cdot h)\left(\dfrac{L}{K}\right)$$

where E is the depth of the groove measured between the panel supporting faces 34 and the bottom wall 44 of the groove, h is the pilot height measured between the panel supporting faces 34 of the flange portions and the piercing face 28. K is the stress factor for filleted bars, taking into account the inside radius 46 at the groove bottom wall, which may be found in standard machinery design texts, such as *Machine Design*, by Shigley, McGraw-Hill (1956), FIG. 2-32, p. 36. Where the nut includes grooves 50 in the top face and the fracture plane $P_3$ is defined at an angle to the top face, the area $A_3$ may be defined as follows:

$$A_3 = [(a^2 + b^2)]^{\frac{1}{2}}\left(\dfrac{L}{K}\right)$$

wherein a is equal to $T-(E+F+h)$ and b is equal to $G/2$. Substituting for a and b in the equation above, the area $A_3$ of the nut in fracture plane $P_3$, may be defined as follows:

$$A_3 = \left([T - (E + Fh)]^2 + \left(\dfrac{G}{2}\right)^2\right)^{\frac{1}{2}}\left(\dfrac{L}{K}\right)$$

Because the areas $A_1$, $A_2$ and $A_3$ are to be generally equal in the preferred dimensional relationship of the flush-mountable pierce nut of this invention, the area equations above are then solved simultaneously by setting $A_1 = A_2 = A_3$ and solving for L because the cut-off length L of the nut may then be adjusted to meet the minimum strength required to prevent distortion of the nut pilot during the piercing of the nut bore 30, as described above. The area equations may then be solved simultaneously for L, assuming that the nut includes grooves 50 in the top face 24 of the nut such that the fracture plane $P_3$ is defined at an angle to the top face as shown in FIG. 1:

$$L = \dfrac{A}{\left(\left[\dfrac{AK(P \cdot G + g)}{2\cos a\left(AK + \dfrac{\pi D^2}{8\cos a}\right)}\right]^2 - \left(\dfrac{G}{2}\right)^2\right)^{\frac{1}{2}} + E + F + h}$$

If, however, the nut does not include grooves 50, F=0 and the dimensional relationship is as follows:

$$L = \dfrac{A}{\left(\left[\dfrac{AK(P \cdot G + g)}{2\cos a\left(AK + \dfrac{\pi D^2}{8\cos a}\right)}\right]^2 - \left(\dfrac{G}{2}\right)^2\right)^{\frac{1}{2}} + E + h} + D$$

As will be understood, the areas of the panel bearing faces of the flange portions must be sufficient to prevent pull-through of the nut, as defined above, and the width W of the nut is simply the summation of the widths of the pilot P, the re-entrant groove openings (g+g) and the widths of the flange bearing surfaces (C+C).

Having defined the preferred dimensional relationships of the flush-mountable pierce nut of this invention, it is now possible to design a nut or redesign the present commercial flush-mountable pierce nut pursuant to this dimensional relationship to define the optimum dimensional relationship such that the beam load of the nut or the beam load of the nut and panel assembly is equal to or greater than the proof load of the bolt, while optimizing the volume of the nut and reducing the material costs. For example, the present H-S 22 "Hi-Stress" pierce nut of the Assignee, which is designed to accept an eight millimeter threaded bolt, was redesigned pursuant to the above defined dimensional relationship, as now described. The area $A_1$ of the present H-S 22 nut in fracture plane $P_1$ was calculated, as defined above, as 0.065 square inches, $A_2$ was 0.054 square inches and $A_3$ was 0.048 square inches. As will now be understood, this pierce nut normally failed in a beam load test in fracture plane $P_3$, however, the nut exceeded the minimum proof load by over 2,000 lbs. The minimum proof load requirement of an eight millimeter threaded nut, as specified by the automotive industry, is 8,138 lbs. The proof load of an H-S 22 pierce nut was, however, 10,426 lbs. Thus, it was possible to redesign the H-S 22 nut to withstand a proof load of approximately 9,000 lbs. which assures the minimum nut proof load requirement, using a standard three sigma deviation.

The minimum thickness of the nut T may be determined from the strength of the nut material and the pitch of the threads by standard calculations. The beam strength of the nut or the nut and panel assembly, as defined above, is preferably at least equal to the proof load of the bolt. For example, the minimum proof load for a class 9.8, eight millimeter bolt, is 5,350 lbs. The areas $A_1$, $A_2$ and $A_3$ should then be at least equal to the beam strength divided by the strength of the nut material. As will be understood, the panel adds beam strength to the nut and panel assembly. In a rolled steel pierce nut of the type described, the strength of the nut material is approximately 130,500 lbs. per square inch. Thus, the areas $A_1$, $A_2$ and $A_3$ should be approximately 0.041 square inches, reducing the volume of the nut by approximately twenty seven percent. As described above, the dimensions E, G, g and h are determined by the panel thickness into which the nut is to be installed. D, P and T will be determined by the size of the thread requirement. Finally, the equation may then be solved for L, fixing the final dimensional relation of the nut, which resulted in a twenty seven percent reduction in the volume of the H-S 22 nut, as described above.

FIG. 2 illustrates the advantage of the flush-mountable nut 20 of this invention having the dimensional relation described above. The nut 20 has been redesigned from the configuration 56 shown in phantom such that the areas in the shear planes are substantially equal reducing the material cost without sacrificing the integrity or strength of the nut in the nut and panel assembly.

It is thus possible to define the optimum dimensional relationship of the flush-mountable pierce nut of the type described herein by determining the fracture planes by experimentation and designing the nut such that the fracture planes are approximately equal and the strength of the nut or the nut and panel assembly in the fracture planes exceeds the minimum proof load of the bolt. As will be understood, the flush-mountable nut of this invention will be designed to withstand the minimum proof load of the classification of the bolt specified for the application. This relation will optimize the volume of the nut, reducing the material costs while maintaining the integrity of the nut.

Having described the preferred embodiments of the flush-mountable pierce nut of this invention, I now claim the invention as follows:

1. A self-piercing nut fastener substantially flush mounted in a panel, wherein said nut fastener serves as a punch in a die set, said nut fastener having a top face, a rectangular pilot portion having a generally flat piercing face defining the bottom face of said nut fastener, said nut bottom piercing face extending through an opening in said panel, said piercing face having a width P and length L, a nut bore having an internal diameter D extending through said pilot portion piercing face and said top face receiving a threaded bolt, flange portions on opposed sides of said pilot portion each having a panel supporting face on said opposed sides of said pilot portion generally parallel to and spaced from the plane of said piercing face by a distance h, said panel supporting faces contacting said panel on opposed sides of said panel opening, and parallel re-entrant grooves defined in said flange portion panel supporting faces at the opposed sides of said pilot portion, said grooves each having opposed relatively inclined side walls defining a restricted opening at the plane of said panel supporting faces having a width g, a bottom wall having a width G which is greater than the width g of said restricted opening and a depth E measured between the panel supporting faces and the bottom wall of said groove, said groove bottom wall joining said side walls through arcuate surfaces, said re-entrant grooves receiving and retaining the pierced edges of said panel adjacent said panel opening thereby forming a mechanical interlock with said panel, said nut fastener formed by cutting off a preformed section having a longitudinal axis parallel to said grooves and said nut fastener having a preferred minimum length L dependent upon the internal diameter D of said bore to avoid fracture of said pilot in a fracture plane $P_1$ parallel to said grooves defined through the axis of said bore perpendicular to said piercing face, said nut fastener also subject to fracture under proof load in said nut, panel and bolt assembly in a plane $P_2$ extending through the axis of said bore parallel to said grooves at said nut fastener top face and the inside radius of one of said grooves at said groove bottom wall and a fracture plane $P_3$ extending through said inside groove radius and said nut fastener top face, said fracture planes $P_1$ and $P_2$ intersecting said nut fastener top face in an acute angle a, characterized in that the areas A of said nut fastener through said fracture planes $P_1$, $P_2$ and $P_3$ are approximately equal pursuant to the following general dimensional relationship:

$$L = \frac{A}{\left(\left[\frac{AK(P - G + g)}{2\cos a \left(AK + \frac{\pi D^2}{8\cos a}\right)}\right]^2 - \left(\frac{G}{2}\right)^2\right)^{\frac{1}{2}} + E + h} + D$$

wherein K is the stress factor for filleted bars taking into account said inside radius at said groove bottom wall and the shear strength of said nut fastener in each of said areas A is at least equal to the proof load of said bolt in said nut, panel and bolt assembly divided by said area as determined by the strength of the material utilized in forming said nut fastener, whereby the volume and thereby the material cost of said nut fastener is minimized while maintaining the optimum and uniform strength of said nut in said nut, panel and belt assembly.

2. The nut fastener and panel assembly defined in claim 1, wherein said nut fastener top face includes parallel grooves having a depth F on opposed sides of said nut bore generally parallel to said re-entrant grooves and said fracture plane $P_3$ extends through the axis of said top face grooves and said dimensional relationship is as follows:

$$L = \frac{A}{\left(\left[\frac{AK(P - G + g)}{2\cos a \left(AK + \frac{\pi D^2}{8\cos a}\right)}\right]^2 - \left(\frac{G}{2}\right)^2\right)^{\frac{1}{2}} + E + F + h} + D.$$

3. A self-piercing flush-mountable nut fastener attached to a panel forming a nut and panel assembly, said nut fastener having a top face, a central pilot portion and flange portions on opposed sides of said pilot portion at the bottom face of said nut fastener, said flange portions each having a panel supporting face and said central pilot portion having a piercing face projecting and spaced from said panel supporting faces of said flange portions, a central nut bore through said pilot portion, generally perpendicular to said top face, receiving a threaded bolt and grooves defined in said flange portions on opposed sides of said pilot portion, said pilot portion piercing face piercing a slug from said panel and said grooves receiving the panel portions adjacent the pierced panel edges permanently attaching said nut on said panel, said nut subject to shear fracture in beam load in said nut and panel assembly, wherein the load transmitted by said bolt threaded in said nut bore is transmitted through said flange portion bearing faces in said nut and panel assembly, and said nut subject to failure in one of five fracture planes, the first fracture plane being defined generally perpendicular to said top face in the axis of said nut bore, generally parallel to said nut grooves, the second and third fracture planes being defined through the inner edges of said nut grooves and the axis of said nut bore at said top face, and the fourth and fifth fracture planes being defined through the bottom of said nut grooves and the top face of said nut, the areas of said nut in said fracture planes divided by the stress factor being substantially equal, and said areas of said nut in said fracture planes divided by said stress factor being at least equal to the proof load of said bolt in pounds divided by the strength of the formed nut material in pounds per square inch.

* * * * *

UNITED STATES PATENT AND TRADEMARK OFFICE
CERTIFICATE OF CORRECTION

PATENT NO. : 4,971,499

DATED : November 20, 1990

INVENTOR(S) : Harold A. Ladouceur

It is certified that error appears in the above-identified patent and that said Letters Patent is hereby corrected as shown below:

In column 10, line 19, add --D-- after the plus (+) sign.

In line 25, delete --D--.

Signed and Sealed this

Seventeenth Day of November, 1992

*Attest:*

DOUGLAS B. COMER

*Attesting Officer*     *Acting Commissioner of Patents and Trademarks*